US009766157B2

(12) United States Patent
England, Jr. et al.

(10) Patent No.: US 9,766,157 B2
(45) Date of Patent: Sep. 19, 2017

(54) DEVICE AND METHOD OF MEASURING POWERTRAIN BACKLASH

(71) Applicant: FORD GLOBAL TECHNOLOGIES, LLC, Dearborn, MI (US)

(72) Inventors: Verbie Gene England, Jr., Warren, MI (US); Michael James Carter, Troy, MI (US); Robert Thomas Kraus, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 14/847,030

(22) Filed: Sep. 8, 2015

(65) Prior Publication Data

US 2017/0067795 A1 Mar. 9, 2017

(51) Int. Cl.
*G01M 13/02* (2006.01)
(52) U.S. Cl.
CPC .................... *G01M 13/02* (2013.01)
(58) Field of Classification Search
CPC ..... F16H 57/01; G01M 13/021; G01M 13/02; G01M 13/023; G01M 13/025; G01M 13/027
See application file for complete search history.

(56) References Cited

U.S. PATENT DOCUMENTS

| 3,298,228 | A | * | 1/1967 | Oltean | G01M 13/025 73/115.06 |
| 3,715,909 | A | * | 2/1973 | Wolanin | G01M 13/021 73/115.06 |
| 5,033,292 | A | | 7/1991 | Dennis | |
| 6,907,773 | B2 | * | 6/2005 | Passino | F16C 25/06 73/115.06 |
| 7,577,507 | B2 | | 8/2009 | Morris | |
| 8,046,142 | B2 | | 10/2011 | Morris et al. | |
| 8,733,183 | B1 | | 5/2014 | Yanakiev et al. | |
| 8,918,292 | B2 | * | 12/2014 | Wener | B25B 23/1425 7/138 |
| 9,109,975 | B2 | * | 8/2015 | Revach | G01B 21/02 |
| 9,290,089 | B2 | * | 3/2016 | Xia | B60K 6/365 |
| 2014/0039810 | A1 | * | 2/2014 | Wener | B25B 23/1425 702/41 |
| 2014/0290084 | A1 | * | 10/2014 | Revach | G01B 21/02 33/701 |
| 2015/0260608 | A1 | * | 9/2015 | Inamori | G01M 13/023 73/812 |

OTHER PUBLICATIONS

Driveshaft backlash angle measuring apparatus of Model SG-430, Jun. 25, 2015, http://clarkke.com/automobile/201501/20993.html, 5 pages.

* cited by examiner

*Primary Examiner* — Freddie Kirkland, III
(74) *Attorney, Agent, or Firm* — James Dottavio; Brooks Kushman, P.C.

(57) ABSTRACT

The present invention in one or more embodiments provides a device to measure backlash of an equipment powertrain, where the device includes a head to attach to the equipment powertrain, and a body to support the head, the body including a first connector via which a predetermined amount of torque is to be applied to the equipment powertrain through the body and the head, and a positional change of the equipment powertrain in response to the predetermined amount of torque being indicative of a backlash measurement.

20 Claims, 5 Drawing Sheets

DEVICE AND METHOD OF MEASURING POWERTRAIN BACKLASH

TECHNICAL FIELD

The present invention relates to a device and a method of measuring powertrain backlash, in particular axle backlash, transmission backlash and/or total driveline backlash. The powertrain backlash measurements may be taken off of any suitable automotive vehicles and equipment, with non-limiting examples thereof including vehicular powertrains, off road equipment powertrains and farm equipment powertrains.

BACKGROUND

Automotive powertrains or drivetrains include meshed gear teeth which may exhibit dead-band when applied torque direction changes. The dead-band may cause discontinuity of the transmitted torque and often be termed "backlash" as being in the dead-band zone.

For instance, publication U.S. Pat. No. 8,733,183 B1 discloses a torque measurement system involving a driveline with two shafts connected by a torsional discontinuity, where the discontinuity is represented by two meshing gears, each of which being secured to one of the shafts.

SUMMARY

In one or more embodiments, a device is provided to measure backlash of an equipment powertrain, where the device includes a head to attach to the equipment powertrain, and a body to support the head, the body including a first connector via which a predetermined amount of torque is to be applied to the equipment powertrain through the body and the head, and a positional change of the equipment powertrain in response to the predetermined amount of torque being indicative of a backlash measurement.

The body may include a base and a neck positioned between the head and the base, and the base is to position an inclinometer to output the positional change. At least one of the head and the body includes a metal.

The device may further include a second connector via which the head is detachably connected to the neck. The head may include first and second head portions together defining there-between an aperture to receive there-through a portion of the equipment powertrain. The device may further include a third connector via which the first head portion is detachably connected to the second head portion. The device may further include a fourth connector via which the head is to be connected to a companion flange which is in turn connected to the equipment powertrain.

The device may further include a stabilizer to stabilize the inclinometer as being positioned on the base.

In another or more embodiments, a method is provided to measure backlash of an equipment powertrain via a device, the device including a head and a body supporting the head, where the method includes attaching the head of the device to the equipment powertrain, applying a predetermined amount of torque to the body, and determining positional change of the body in response to the predetermined amount of torque as a backlash measurement of the equipment powertrain.

The method may further include subjecting the equipment powertrain to an elevated position away from the ground upon which an operator stands.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein.

DETAILED DESCRIPTION OF ONE OR MORE EMBODIMENTS

Figure 1:
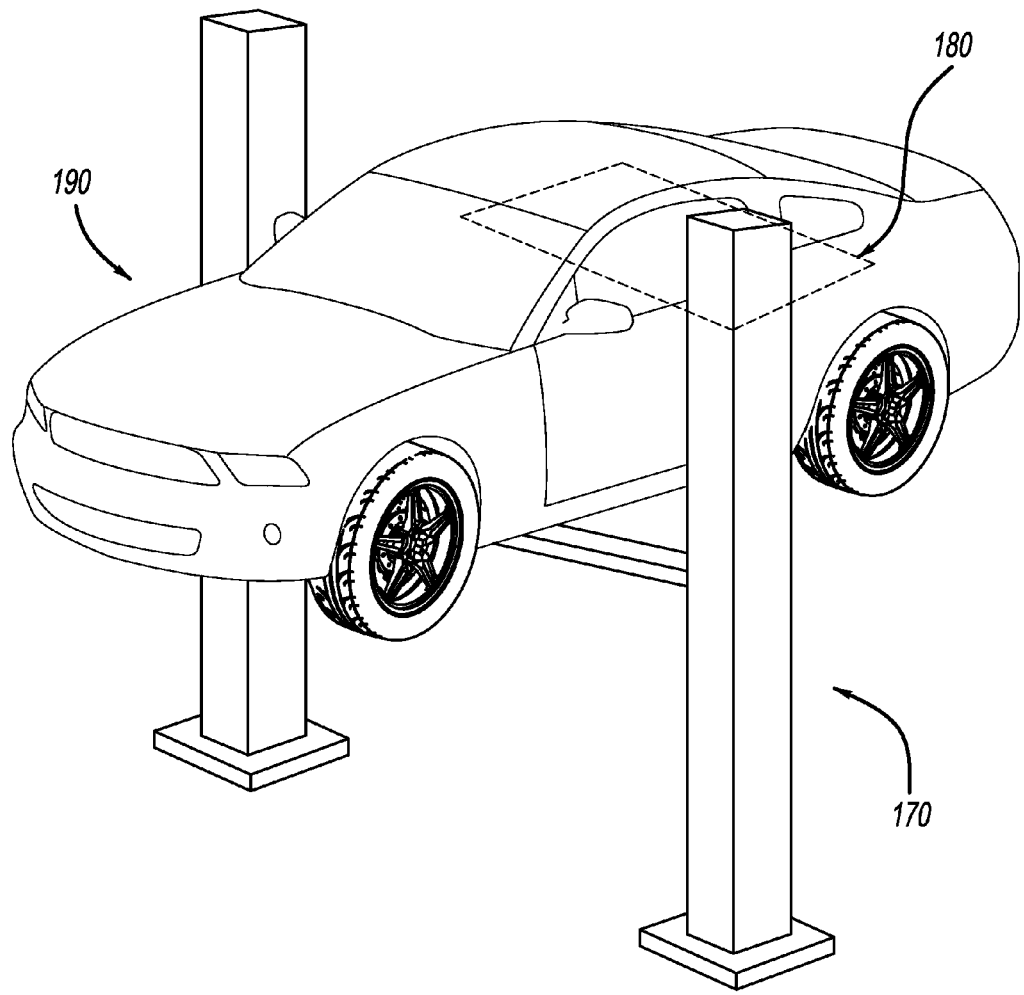
FIG. 1 illustratively depicts a vehicle being elevated in preparation for backlash measurement according to one or more embodiments.

As referenced in the FIG.s, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

The present invention in one or more embodiments is advantageous at least in providing a device and a method via which backlash of an equipment powertrain may be measured in a field environment, such as when the equipment is uplifted in a repair shop, while the driveshaft does not need to be disconnected for considerable benefits in parts and labor. The powertrain backlash measurements may be taken off of any suitable automotive equipment, with non-limiting examples thereof including vehicular powertrains, off road equipment powertrains and farm equipment powertrains. As detailed herein elsewhere, and in the particular example of an automobile, the device may in certain instances be mounted to an axle companion flange and/or a transmission output flange of a vehicle, a pre-determined amount of torque may be applied to the device, and positional change of the device may be measured as an indication of the backlash.

For mere illustration purposes and in the interest of brevity, detailed description is to be made in view of FIG. 1 through FIG. 5, employing a vehicle as a non-limiting example of the automotive equipment mentioned herein.

Figure 2:
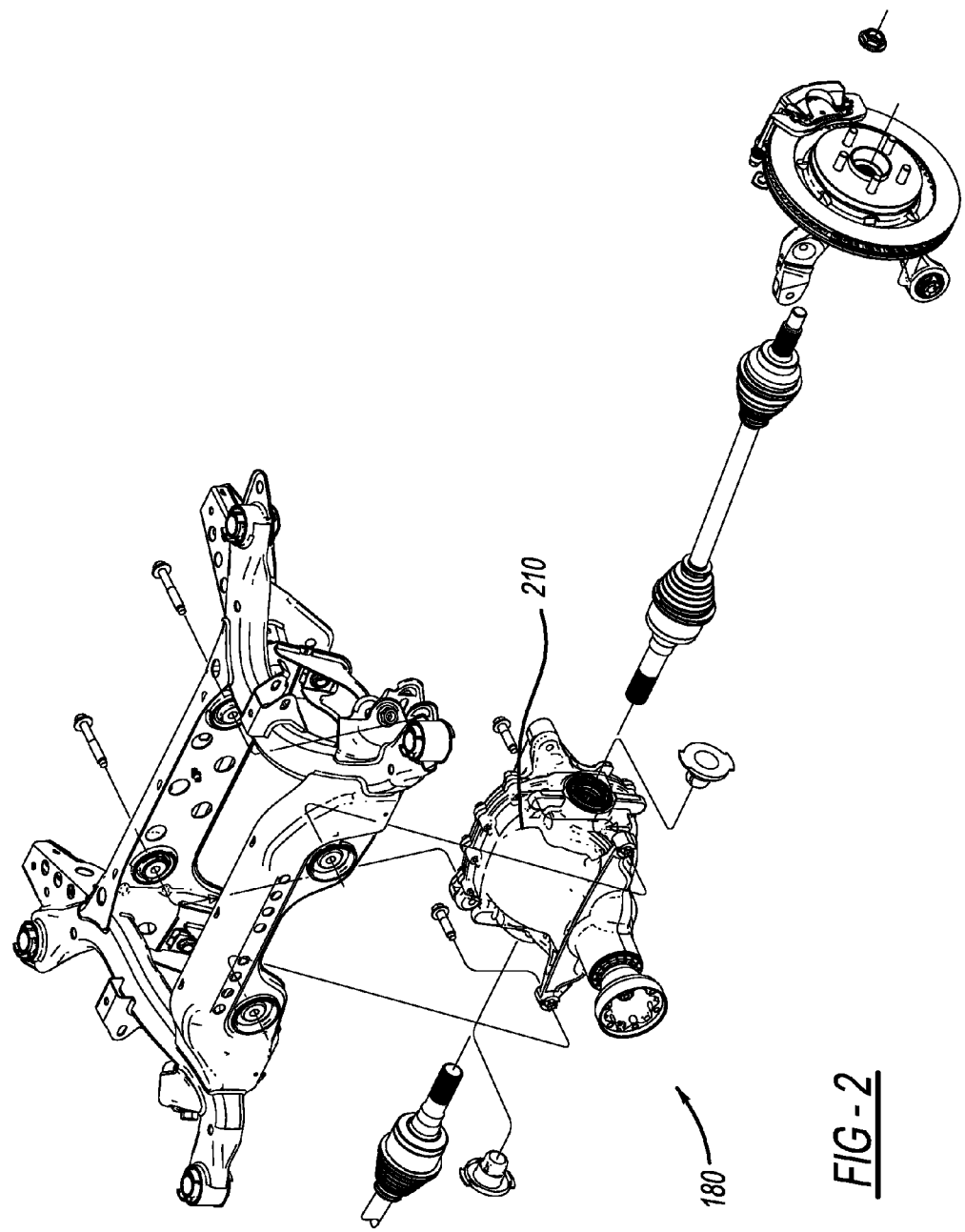
FIG. 2 illustratively depicts an exploded view of a suspension axle of the vehicle referenced in FIG. 1, where the backlash measurement is to take place.
Figure 3:
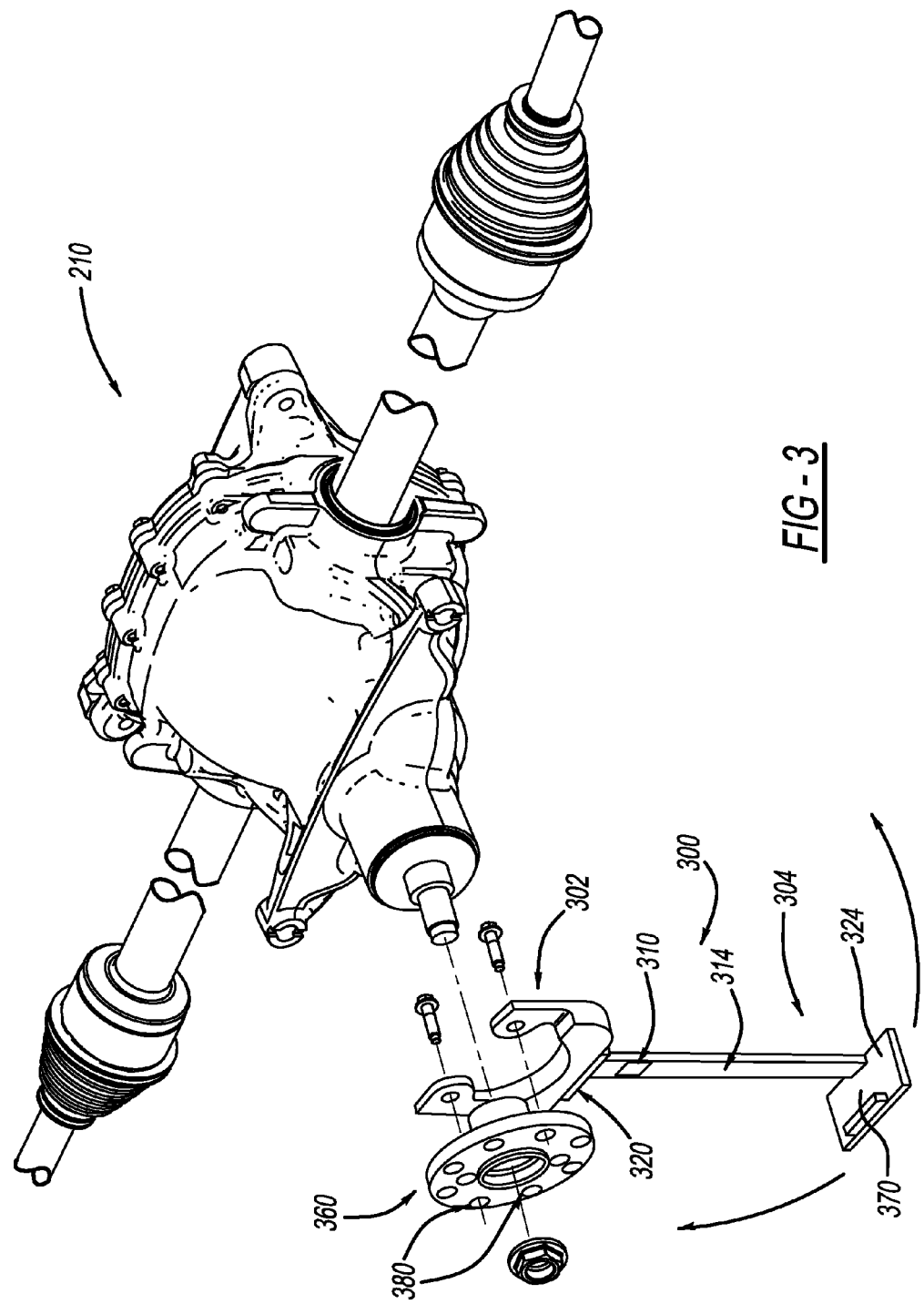
FIG. 3 illustratively depicts a partial perspective view of the suspension axle referenced in FIG. 2, where a measuring device is being assembled thereto in preparation for the backlash measurement.

In one or more embodiments, and in view of FIG. 1 through FIG. 3, a device 300 may be used to measure vehicle powertrain backlash of a vehicle 190, where the vehicle 190 may be uplifted off the ground via an elevation frame 170 and a driveline axle 180 of the vehicle 190 may be readily accessible to an operator. Various types of backlash may be measured and determined via the employment of the device 300 and its alternative designs, where non-limiting examples of the types of backlash include vehicle axle backlash, vehicle transmission backlash and vehicle total driveline backlash.

Referring back to FIG. 3 which illustratively depicts a portion of the driveline axle 180, the device 300 includes a head 302 to attach to the driveline axle 180, and a body 304 to support the head 302, wherein the body 304 includes a first connector 310 via which a predetermined amount of torque is to be applied to a differential housing 210 through the body 304 and the head 302, and a positional change of the driveline axle 180 in response to the predetermined amount of torque is indicative of a backlash measurement. The first connector 310 may be a design on the body 304 to which a torque may be externally applied. In the event that the torque is externally applied via a wrench such as a drive wrench, a chain wrench and a strap wrench, the first connector 310 may be configured as a cavity or an aperture to receive a portion of the wrench and hence a torque applied through the wrench. In certain other embodiments, the first connector 310 may be of any other suitable structures, such as a structural extension of the body 304 via which the torque may be imparted onto the driveline axle 180.

Figure 4:
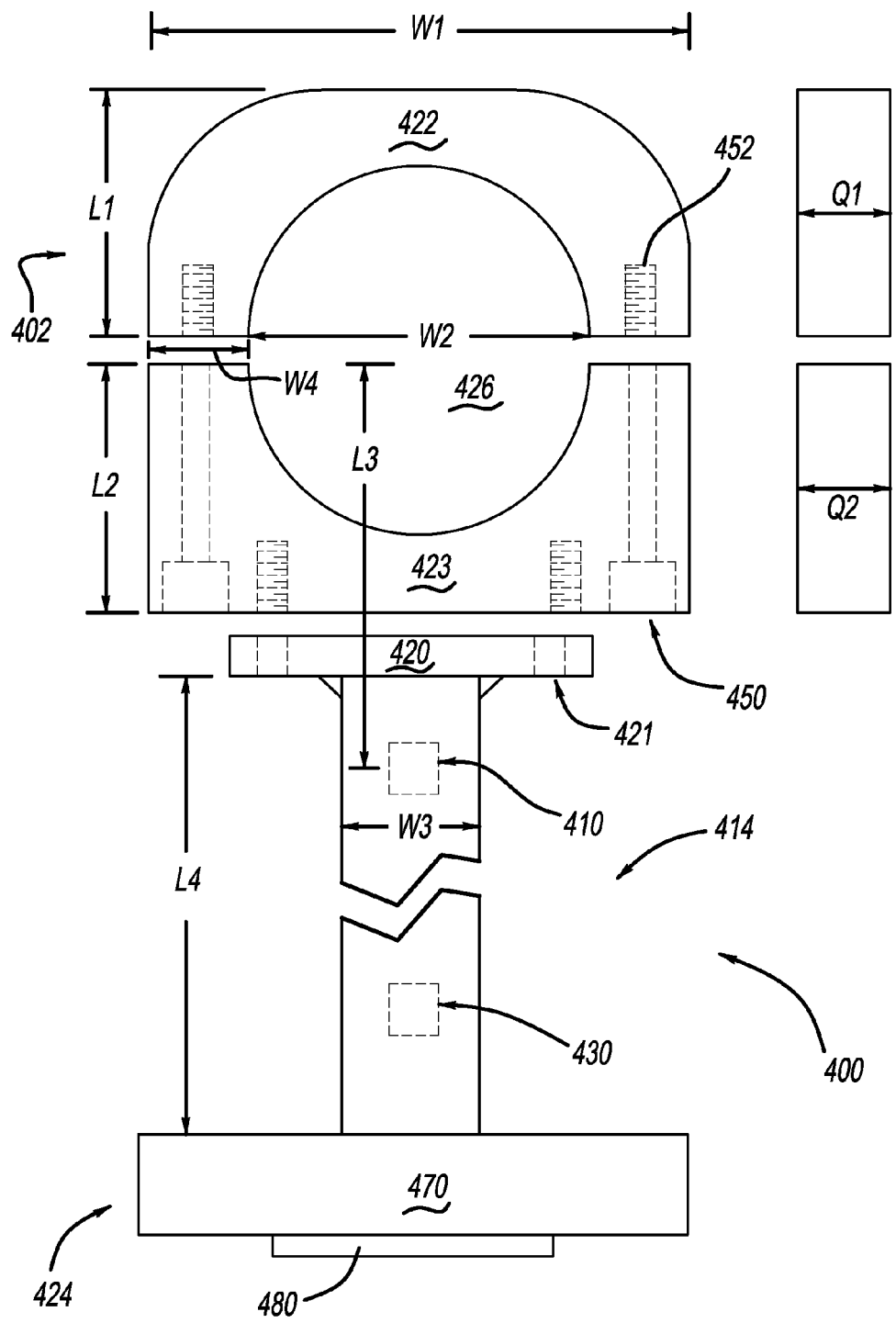
FIG. 4 illustratively depicts a front view of a measuring device as an alternative to the measuring device referenced in FIG. 3.

As an alternative to the device 300, and in view of FIG. 4, a device 400 may be configured to include a head 402, a base 424 and a neck 414 positioned there-between, where the head 402 includes first and second head portions 422, 423 together defining there-between an aperture 426 to receive there-through a portion of the driveline axle 180. The first and second head portions 422, 423 may move apart from each other to, for instance, vary the dimension of the aperture 426. To do so, the first and second head portions 422, 423 may be detachably connected to each other via a third connector 450, which may extend through the second head portion 423 and have its end portion 452 received into the first head portion 422 to allow for engagement and disengagement of the first and second head portions 422, 423. Non-limiting examples of the third connector 450 include one or more bolts, screws, clamps and hinges.

Referring back again to FIG. 3, the body 304 may include a base 324 and a neck 314 positioned between the head 302 and the base 324, and the base 324 is to position an inclinometer 370 to output the positional change. The head 302 may be detachably connected to the body 304, and the neck 314 of the body 304 in particular, via a second connector 320.

Similar configuration may be applied to the device 400 referenced in FIG. 4 such that the head 402 is readily detachable and attachable to the body 404, and the neck 414 in particular. Collectively, the device 300 and the device 400 may be configured to have a body of universal dimensions which is readily accepting a head of various dimensions dependent upon the particular vehicle types at hand. For instance, the head 302 and the head 402 may be interchangeably attachable to the neck 314 or the neck 414. In practice, a universal body or a universal neck accepting a device head of variations provides additional cost benefits and labor efficiencies.

Referring back to FIG. 4, a second connector 420 may be employed along with one or more bolts 421 to effectuate engagement and disengagement of the head 402 from the neck 414. The second connector 420 may be a standalone component separable from either the head 402 or the neck 414. The second connector 420 may also be pre-assembled or fixed onto the head 402 or the neck 414. At an engagement position, the bolt 421 passes through the second connector 420 and is received into the head 402 and in particular the second head portion 423 of the head 402. Accordingly the head 402 may be detachably connected to the neck 414, and the neck 414 may be used to connect to heads of variable sizes and configurations.

Similar structures may be applied to the second connector 320 referenced in FIG. 3 to effectuate an engagement and disengagement of the head 302 relative to the body 304.

Referring back to FIG. 3, the device 300 and its head 302 in particular may be attached to a companion flange 360 of the driveline axle 180 via a fourth connector 330, with non-limiting examples thereof including one or more bolts, screws, clamps and hinges.

The companion flange 360 may be of any size, material and configuration suitable for the vehicle environment. The companion flange 360 may be presented with one or more flange holes 380 to align with another flange (not shown) for ease of pipeline connection. In addition, the companion flange 360 may represent an area of the driveline where pipe size and dimension may needed to be changed and the companion flange 360 may be employed to allow a simple dis-assembly of the pipe in the future if needed. Therefore the companion flange 360 provides an easy access for assembly, dis-assembly and any measurements that might need to be taken.

Without wanting to be limited to any particular theory, having the device for instance device 300 attached to the companion flange is believed to provide a good measurement of backlash. Connection to the companion flange is advantageous because the flange is connected to the hypoid pinion (input) providing a mechanical advantage over measurement from the output (ring gear) based on the gearset ratio. A measurement at the output (wheel) may result in lash multiplication. Additionally measurement at the input allows exclusion of differential backlash for traction enhancing differentials such as LSD (limited slip differential), eLSD (electronic limited slip differential), and Torsen. Furthermore, if desired, the device may facilitate measurement of the half shaft CV (constant velocity) joints and wheel ends to allow measurement of a total driveline backlash as part of the powertrain backlash measure.

In certain embodiments, and when a backlash measurement is taken, the device 300 or some portions thereof may be contacting or be even mounted onto the companion flange 360. After the attachment, all involved parts may move together in a relatively rigid fashion. Lose part connection may in some instances disqualify the measurement, and the connections may be enforced with one or more connectors or fasteners such as bolts and screws.

The head 302 of the device 300 may have been configured to fit around the companion flange 360 referenced in FIG. 3. In addition, the connection may be carried out through the flange holes 380 of the companion flange 360. Alternatively, the head 402 of the device 400 may be employed in other locations of the driveline axle 180, where a portion of the driveshaft may be clamped between the first and second head portions 422 and 423, and received through the aperture 426. In this configuration, additional connectors such as bolts, screws, hinges or clamps configured in FIG. 3 may not be needed in situations where the device 400 is employed.

Referring back again to FIG. 4, the inclinometer 370, 470 may be employed in connection with the device 400 to collectively take measurements on the positional changes recorded with the device 400 in response to a pre-determined amount of torque imparted onto the driveline axle 180 via the device 400. As positional movements may need to be recorded with certain level of accuracies, the positioning of the inclinometer 470 onto the base 424 may be enhanced with the use of a stabilizer 480. In non-limiting example, the stabilizer 480 may be a magnetic material or a magnet placed underneath the base 424 to stabilize the inclinometer 470. This configuration helps ensure the readily attachment and detachment of the inclinometer 470 from the base 424. In the event that the inclinometer 470 may sit on the base 424 without having to be detached upon a completion of the measurement, other forms of the stabilizer 480 may be used, such as hooks, ropes, nets, or even adhesives.

Referring back to FIG. 4, a first connector 410 is positioned on the neck 414 and spaced apart with a distance L3 from the aperture 426, and more particularly from an upper edge AB of the second head portion 423. As with the first connector 310 referenced in FIG. 4, the first connector 410 is similarly and strategically positioned such that a torque-applying tool (not shown) such as a wrench may land on or through the first connector 410 and a torque may consequently be applied to the shaft received through the aperture 426 via the torque-applying tool, the neck 414, and the head 402 as connected to the neck 414. Similar to the first connector 310 referenced in FIG. 3, the first connector 410 may be a design on the neck 414 to which a torque may be externally applied. In the event that the torque is externally applied via a wrench such as a drive wrench, a chain wrench and a strap wrench, the first connector 410 may be configured as a cavity or an aperture to receive a portion of the wrench and hence a torque applied through the wrench. In certain other embodiments, the first connector 410 may be of any other suitable structures, such as a structural extension of the neck 414 via which the torque may be introduced.

The distance L3 may be designed to allow for variations in a target torque to be applied. To provide for further flexibility in allowing for variations, the neck 414 may vary in its length by any suitable methods such as being foldable and being telescopic. Moreover, a second or more connectors 430 may be positioned on the neck 414, in addition to the first connector 410 and optionally positioned next to the first connector 410, to allow for variations in the position upon which the torque-applying tool is to land on the neck 414 and hence the variations in the torque applied.

Referring back to FIG. 4, the first and second head portions 422 and 423 may be of any suitable length dimensions L1 and L2, respectively. In certain designs, L1 and L2 are each independently in a range of 0.5 to 3 inches, 1 to 2.5 inches, or 1.5 to 2 inches, and may be of the same value within the range.

Referring back to FIG. 4, the first and second head portions 422 and 423 may be of any suitable thickness dimensions Q1 and Q2, respectively. In certain designs, Q1 and Q2 are each independently in a range of 0.2 to 1.4 inches, 0.4 to 1.2 inches, or 0.6 to 1.0 inches, and may be of the same value within the range.

Referring yet again back to FIG. 4, the first head portion 422 or the second head portion 423 may be of a width W1 with any suitable values, such as being in a range of 2.5 to 5.5 inches, 3 to 5 inches, or 3.5 to 4.5 inches.

Referring yet again back to FIG. 4, the aperture 426 may be of a width W2 with any suitable values, such as being in a range of 1.75 to 3.25 inches, 2 to 3 inches, or 2.25 to 3 inches.

Referring yet again back to FIG. 4, the head 402 may be of a rim thickness W4 which reflects half of the difference between W1 and W2. W4 may be of any suitable values such as 0.2 to 1.4 inches, 0.4 to 1.2 inches, or 0.6 to 1.0 inches.

Referring yet again back to FIG. 4, the neck 414 may be of a length dimension L4 with any suitable values, such as being in a range of 4 to 16 inches, 6 to 14 inches, or 8 to 12 inches. It is noted that the length dimension L4 may be varied according particular backlash measuring environment at hand.

Referring yet again back to FIG. 4, the neck 414 is of a width dimension W3 with any suitable values, such as being in a range of 0.4 to 1.6 inches, 0.6 to 1.4 inches, or 0.8 to 1.2 inches.

Collectively, the device 300 or the device 400 may mount to the axle companion flange 360 in car without the driveshaft disconnected. The mounting of the device 300, 400 to the companion flange 360 may be achieved by clamping onto the companion flange 360 via suitable methods, such as with the first and second head portions 422, 423 in the form of two half round bracket and two bolts 450. The device 300, 400 may include a base 324, 424 in the form of a cradle to support an inclinometer such as the inclinometer 470 to measure angle. The inclinometer may be secured by the stabilizer 480 such as a magnetic strip adhered to the inclinometer. One or more first connectors 410 and/or 430 may be configured to be of square drive hole, with non-limiting size thereof being in a range of ¼ to 1 inch or ⅜ to ½ inches, that accepts a torque-applying wrench such as a strap wrench, a drive torque wrench and a chain wrench, with non-limiting size thereof being in a range of ¼ to 1 inch or ⅜ to ½ inches, to apply a predetermine torque value for consistency. With the vehicle lifted and the wheels locked in place, a moderate torque is applied in both directions and the angle is read at the inclinometer. Accordingly backlash measured includes several contributors from axles companion flange to wheel.

Figure 5:
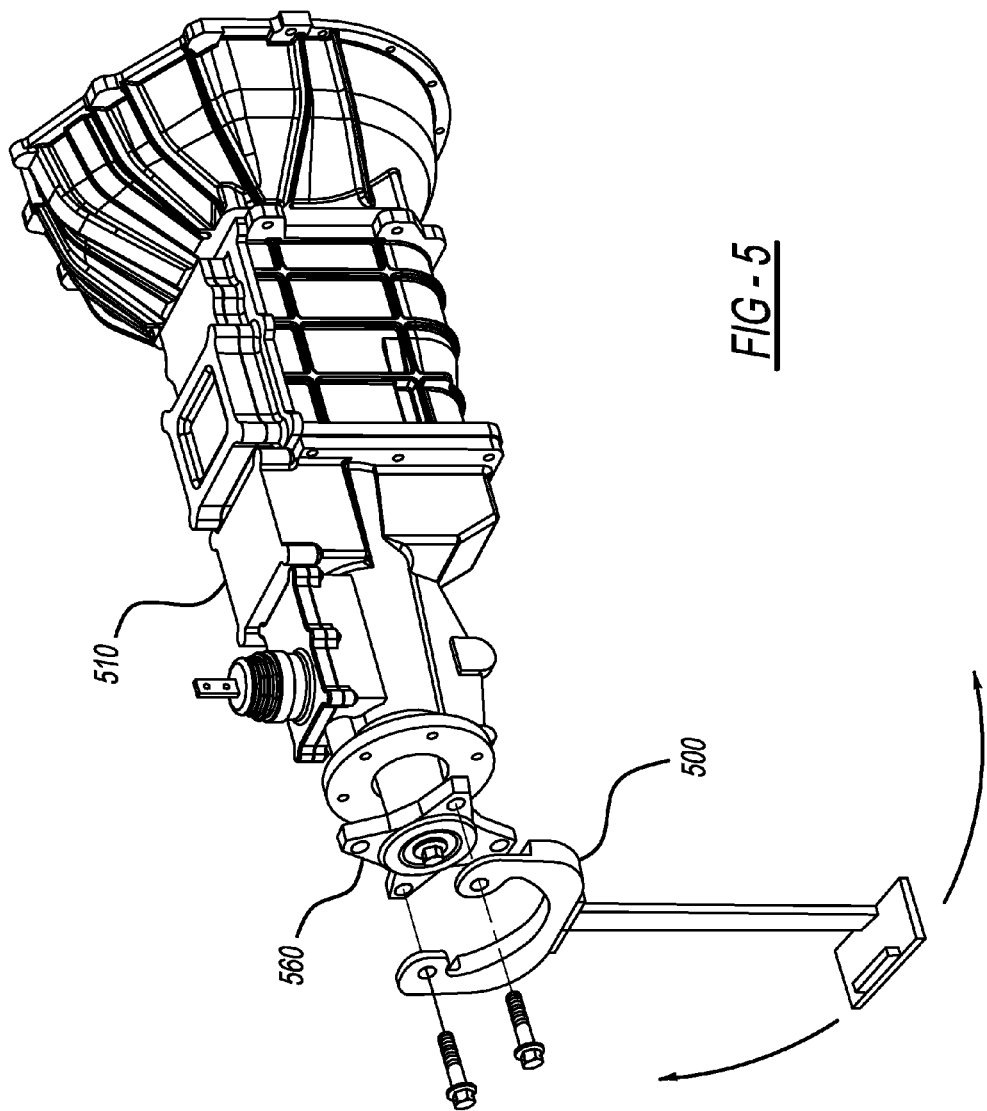
FIG. 5 illustratively depicts a partial perspective view of a transmission of the vehicle referenced in FIG. 1, where a measuring device is being assembled to the transmission in preparation for a transmission backlash measurement.

FIG. 5 illustratively depicts a device 500 as being assembled to a transmission 510 via attachment to a transmission output flange 560. Although the device 500 is illustratively to appear similar to the device 300 referenced in FIG. 3, the device 500 may be configured to appear similar to the device 400 referenced in FIG. 4. Accordingly the device 500 may be configured and/or operable in ways similar to those referenced in relation to the device 300 and/or the device 400.

In one or more embodiments, the present invention as set forth herein is believed to have overcome certain challenges associated with powertrain backlash measurement and determination. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A method of measuring backlash of an equipment powertrain via a device including a head and a body with an inclinometer, the method comprising:
    attaching the head of the device to the equipment powertrain;
    inserting a wrench into a hole defined in the body;
    turning the wrench with a predetermined amount of torque to pivot the body; and
    reading the inclinometer to determining positional change of the body to measure backlash of the equipment powertrain.

2. The method of claim 1, wherein the body includes a base and the method further comprises installing the inclinometer to the base.

3. The method of claim 2 further comprising clamping the head to a driveshaft of the equipment powertrain.

4. The method of claim 1 further comprising:
turning the wrench in a second direction with the predetermined amount of torque to pivot the body; and
reading the inclinometer to determining positional change of the body to measure backlash of the equipment powertrain.

5. The method of claim 1 further comprising fastening the head to a flange of the equipment powertrain.

6. A device for measuring powertrain backlash comprising:
an elongated body including:
a head directly attachable to a driveshaft,
a base including a stabilizer, and
a rod extending from the head to the base and defining a hole configured to receive a portion of a torque wrench, wherein the base is perpendicular to the rod; and
an inclinometer disposed on a side of the base facing the head and secured to the base via the stabilizer.

7. The device of claim 6, wherein the stabilizer is a magnet.

8. The device of claim 7, wherein the magnet is attached to a second side of the base that is opposite the side.

9. The device of claim 6, wherein the head is U-shaped and defines a first arm and a second arm that each define a hole, the head being configured to be fastened to a flange of the driveshaft via fasteners extending through the hole in each of the first and second arms.

10. The device of claim 6, wherein the head includes a first portion and a second portion that are detachable from each other and cooperate to define an aperture configured to receive the driveshaft when attached to each other.

11. The device of claim 10, wherein the second portion is attached to the rod and defines through bores, and the first portion defines tapped bores and is connectable to the second portion such that each of the tapped bores is aligned with one of the through bores, and further comprising fasteners receivable in the through bores to threadably engageable with the tapped bores to secure the first and second portions to each other and to clamp the body to the driveshaft.

12. The device of claim 10, wherein rod defines a flange and the second portion is fastened to the flange by fasteners extending through the flange and into the second portion.

13. A device for measuring powertrain backlash comprising:
a head attachable to a powertrain component,
a base including a stabilizer, and
a neck extending from the head to the base and defining a hole configured to receive a portion of a torque wrench, wherein the base is perpendicular to the rod; and
an inclinometer disposed on a side of the base facing the head and secured to the base via the stabilizer.

14. The device of claim 13, wherein the head includes a first portion and a second portion that cooperate to form a clamp configured to grip the powertrain component.

15. The device of claim 14, wherein the head further includes fasteners that secure the first and second portions to each other.

16. The device of claim 13, wherein the head is U-shaped and defines holes configured to receive a fastener that connect with the powertrain component.

17. The device of claim 13, wherein the neck is an elongated member.

18. The device of claim 13, wherein the neck defines a second hole configured to receive a portion of a torque wrench.

19. The device of claim 13, wherein the powertrain component is a driveshaft.

20. The device of claim 13, wherein the powertrain component is an output flange of a transmission.

* * * * *